(12) United States Patent
Gilpin et al.

(10) Patent No.: US 11,893,364 B2
(45) Date of Patent: Feb. 6, 2024

(54) ACCELERATING APPLICATION MODERNIZATION

(71) Applicant: AppLand Inc., Weston, MA (US)

(72) Inventors: Kevin Gilpin, Weston, MA (US); Elizabeth Lawler, Weston, MA (US); Dustin Byrne, Haverhill, MA (US); Daniel Warner, Stow, MA (US)

(73) Assignee: AppLand Inc., Weston, MA (US)

(*) Notice: Subject to any disclaimer, the term of this patent is extended or adjusted under 35 U.S.C. 154(b) by 0 days.

(21) Appl. No.: 17/891,410

(22) Filed: Aug. 19, 2022

(65) Prior Publication Data

US 2022/0391179 A1 Dec. 8, 2022

Related U.S. Application Data

(63) Continuation of application No. 16/911,241, filed on Jun. 24, 2020, now Pat. No. 11,455,150.

(60) Provisional application No. 63/029,027, filed on May 22, 2020, provisional application No. 62/942,638, filed on Dec. 2, 2019.

(51) Int. Cl.
*G06F 8/60* (2018.01)
*G06F 8/35* (2018.01)
*G06F 8/34* (2018.01)
*G06F 8/41* (2018.01)
*G06F 11/36* (2006.01)

(52) U.S. Cl.
CPC ............... *G06F 8/35* (2013.01); *G06F 8/34* (2013.01); *G06F 8/433* (2013.01); *G06F 8/447* (2013.01); *G06F 8/453* (2013.01); *G06F 8/60* (2013.01); *G06F 11/3684* (2013.01)

(58) Field of Classification Search
CPC ..... G06F 8/34; G06F 8/35; G06F 8/41; G06F 8/60; G06F 8/61; G06F 11/3684
See application file for complete search history.

(56) References Cited

U.S. PATENT DOCUMENTS

| 5,581,797 | A | 12/1996 | Baker et al. |
| 6,633,878 | B1 | 10/2003 | Underwood |
| 8,041,554 | B1* | 10/2011 | Limondin ........... G06F 11/3608 703/22 |

(Continued)

OTHER PUBLICATIONS

A. Moser et al., "Exploring Multiple Execution Paths for Malware Analysis"; 2007.

(Continued)

*Primary Examiner* — Hanh Thi-Minh Bui

(57) ABSTRACT

Various embodiments of the present technology generally relate to the characterization and improvement of software applications. More specifically, some embodiments relate to systems and methods for modeling code behavior and generating new versions of the code based on the code behavior models. In some embodiments, a method of improving a codebase includes recording a run of the existing code, characterizing the code behavior via one or more models, prototyping new code according to a target language and target environment, deploying the new code to the target environment, and comparing the behavior of the new code to the behavior of the existing code. In some implementations, generating new code based on the behavior models includes using one or more machine learning techniques for code generation based on the target language and environment.

20 Claims, 12 Drawing Sheets

(56) References Cited

U.S. PATENT DOCUMENTS

| | | |
|---|---|---|
| 8,549,353 B2 | 10/2013 | Thomson et al. |
| 8,780,114 B1 | 7/2014 | Jackey et al. |
| 8,782,614 B2 | 7/2014 | Basak et al. |
| 9,020,939 B2 | 4/2015 | Brodsky et al. |
| 9,047,399 B2 | 6/2015 | Grunberg et al. |
| 9,891,894 B1 | 2/2018 | Englehart |
| 10,318,251 B1 | 6/2019 | Darnell et al. |
| 10,459,819 B2 | 10/2019 | Chen et al. |
| 11,063,849 B1 | 7/2021 | Clegg et al. |
| 11,252,079 B2 | 2/2022 | Michael et al. |
| 11,256,604 B2 | 2/2022 | Agarwal et al. |
| 2002/0188616 A1 | 12/2002 | Chinnici et al. |
| 2003/0093792 A1 | 5/2003 | Labeeb et al. |
| 2004/0031030 A1 | 2/2004 | Kidder et al. |
| 2007/0169011 A1 | 7/2007 | Ramani et al. |
| 2009/0018879 A1 | 1/2009 | Flaxer et al. |
| 2009/0254524 A1 | 10/2009 | Francker et al. |
| 2010/0332473 A1 | 12/2010 | Brodsky et al. |
| 2011/0161946 A1 | 6/2011 | Thomson et al. |
| 2011/0214108 A1 | 9/2011 | Grunberg et al. |
| 2012/0260236 A1 | 10/2012 | Basak et al. |
| 2015/0234730 A1 | 8/2015 | Puthuff et al. |
| 2017/0083585 A1 | 3/2017 | Chen et al. |
| 2019/0012254 A1 | 1/2019 | Gupta et al. |
| 2019/0129724 A1* | 5/2019 | Haun ................. G06F 8/34 |
| 2019/0163452 A1 | 5/2019 | Hoffmann et al. |
| 2020/0104103 A1 | 4/2020 | Mair |
| 2020/0409668 A1* | 12/2020 | Eberlein ........... G06F 11/3447 |
| 2021/0182033 A1* | 6/2021 | Perez Alvarez ....... G06F 8/38 |
| 2021/0218648 A1 | 7/2021 | Clegg et al. |
| 2021/0232485 A1 | 7/2021 | Agarwal et al. |

OTHER PUBLICATIONS

F. Ferrandi et al.; "Implicit Test Generation for Behavioral VHDL Models," 1998.

Urgaonkar et al., "An Analytical Model for Multi-tier Internet Services and Its Application," SIGMETRICS'05, Jun. 6-10, 2005; 12 pages.

* cited by examiner

ACCELERATING APPLICATION MODERNIZATION

CROSS-REFERENCE TO RELATED APPLICATIONS

The present application claims the benefit of and priority to U.S. patent application Ser. No. 16/911,241, filed Jun. 24, 2020, issued as U.S. Pat. No. 11,455,150 on Sep. 27, 2022, entitled "Accelerating Application Modernization," which claims the benefit of and priority to U.S. Provisional Application No. 62/942,638, filed Dec. 2, 2019, entitled "Accelerating Application Modernization" and U.S. Provisional Application No. 63/029,027, filed May 22, 2020, entitled "Accelerating Application Modernization," each of which are expressly incorporated herein by reference in their entirety for all purposes.

BACKGROUND

Program developers often spend a lot of time working to understand previously written code, especially when modern programs are developed from previously existing applications or code, as they frequently are. In order to understand a program, developers spend time exploring and understanding behavior of existing code and identifying areas to enhance, remove, or modify.

Once a developer understands the behavior and architecture of existing code, it is then the job of the developer to prototype targeted code modules, assemble working code into repositories, understand and review behavior of the code changes, and measure progress towards completion, in addition to other tasks. However, these programmer tasks for understanding and modernizing existing code can be extremely time-consuming and inefficient. Thus, a new system for recording, characterizing, and displaying existing code functionality as well as prototyping new code based on deep knowledge of existing code behavior is disclosed.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein generally relate to systems and methods for modeling code behavior and creating improved versions of existing code. In an embodiment, a method of modernizing code comprises recording a run of existing code of an application, generating a behavior model based on the recorded run, and generating new code based at least on the behavior model and a target code language. Generating the behavior model, in the present embodiment, comprises identifying and labeling one or more functional areas of the existing code and identifying one or more code paths connecting steps performed by the existing code.

In some implementations, the method further comprises enabling the display of a graphical depiction of the behavior model. Additionally, the method may comprise generating an architecture depiction of the application depicting one or more features of the application, wherein generating an architecture depiction may comprise generating a high-level view of the existing code by rolling up the one or more code paths. In some implementations, the method further comprises characterizing the application based on the behavior model, wherein characterizing the application based on the behavior model comprises characterizing one or more features of the application and characterizing one or more dependencies, logic, or data queries. The method may further comprise, once the new code is developed, deploying the new code in a target environment. Similarly, the method may include comparing the behavior of the new code to the existing code, predicted behaviors, or desired behaviors. In certain embodiments, generating the behavior model further comprises identifying decision points and code branches between functional areas of the existing code.

In an alternative embodiment, one or more non-transitory computer-readable storage media has program instructions stored thereon that, when read and executed by a processing system, direct the processing system to record a run of an existing code, generate a behavior model based on the recorded run, and generate new code based at least on the behavior model and a target environment. In the present embodiment, the behavior model comprises one or more steps performed by the existing code and one or more code paths connecting the steps performed by the existing code.

In yet another embodiment, a computing apparatus comprises one or more computer-readable storage media, a processing system operatively coupled with the one or more computer-readable storage media, and program instructions stored on the one or more computer-readable storage media. The program instructions, when read and executed by the processing system, direct the processing system to at least record a run of existing code, generate a behavior model based on the recorded run, and enable display of a graphical depiction of the behavior model. To generate the behavior model, the program instructions direct the processing system to identify one or more functional areas of the existing code and identify one or more code paths connecting steps performed by the existing code.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
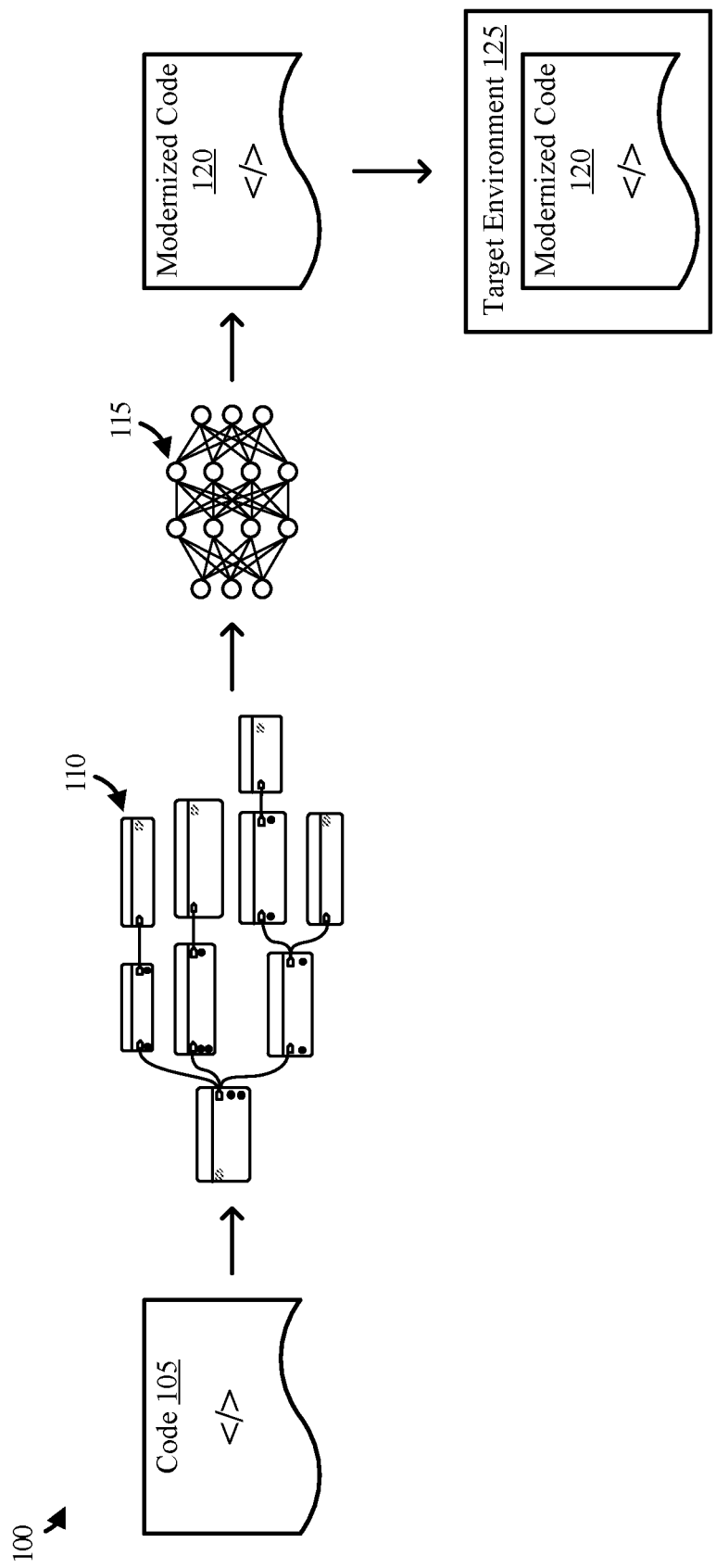
FIG. 1 illustrates a code modernization and deployment process that may be utilized in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to modernization of software applications. More specifically, some embodiments relate to a system for increasing the efficiency of application development by characterizing existing code and prototyping new code for a target language or environment. The present technology uses a combination of methods to interrogate code and characterize applications and features. In an embodiment, a system runs and records the run of an application. A high-level view of the code is created based on the recording by rolling up the data captured in low-level recordings. Based on the recording, the system characterizes the application, or at least one specific feature of the application, and depicts the characterization using graphical visualizations. The recording may then be used in machine learning-assisted prototyping where new code may be suggested or cases tested. New code may be deployed to a target environment, in which the behavior of the new code can be compared and approved.

Aspects of the technology disclosed herein provide for recording and characterizing applications or features of existing or previously written code (i.e., legacy code). Prior to characterizing the code, a computing system in accordance with the present technology may record a run of the existing code. The computing system interprets the code behavior by isolating features and provides a deep characterization of dependencies, logic, and data queries. In the application behavior model, the way the code works can be broken down into clear features and/or steps that can be understood and used by developers. In some examples, a behavior model includes labeling of functional areas of code. The application may be rolled up to create a holistic platform architecture depiction representing code architecture and features. Steps performed by the code may be broken down and displayed in a graphical manner, where the portions of the code are represented in a natural-language manner. For example, after the code is run and recorded, a graphical representation may show that first a session was created, then a username and a password were collected, then a check was performed to see if two-factor authentication was enabled, then settings for the user were checked, then the system checked if the request was coming from a banned internet protocol (IP) address, and finally a dialogue was opened.

It should be noted that recording a run of the code provides distinct advantages over reading the code and trying to build a behavior model based on the reading. In a recording, a behavior modeling system in accordance with the present disclosure may observe a program performing many different tasks and interrogate the recording to analyze an underlying behavior, essentially performing a software audit. The present technology does not need to use or read existing code verbatim when modernizing code and can represent the behavior of a program in a natural language and/or graphical manner. A logic flow of the code (i.e., a conceptual program) is created that serves as an intermediate representation of the program. The intermediate representation can then be used to generate code that mimics the behavior of the existing code or behaves similarly to the existing code, even if the new code is generated in a different language for a different environment. Building new code based on a behavioral model rather than trying to translate from one language or environment to another provides a distinct advantage over previous technologies and produces a better end result by generating new code according to a target language and environment based on a desired behavior rather than an attempted translation.

In some embodiments, the information collected during the recording may then be analyzed using artificial intelligence-assisted prototyping based on a database of code and feature data. The analysis may then be used to suggest new code or test cases. The previously developed behavior model may serve as the basis for intelligent code suggestions performed in a machine learning engine. The machine learning engine, in some embodiments, analyzes and interprets code behavior across various repositories and languages. The machine learning engine may recognize, learn, categorize, anticipate, and recommend robust designs for application behavior. The engine may generate prototype code for any language or target platform.

The new code may subsequently be packaged for deployment within a target system or environment. The generated prototype code includes deployment packaging in some examples, eases developer ramp-up on new deployment platforms, and ensures uniformity of deployment code. Finally, the new code may be behaviorally compared to predicted or desired behaviors, or to the behavior of older versions, prior to approval. The design changes may be presented such that the different versions can be easily compared. Old and new code can be visually represented in order to evaluate correctness, robustness, and security.

FIG. 1 illustrates an exemplary code modernization flow in accordance with certain aspects of the present technology. In process 100, code 105 represents an existing code that is used to generate modernized code 120. Based on code 105, behavior model 110 is created. In certain implementations, a code modernization system records a run of code 105 to generate behavior model 110. Various sources of data may be utilized when recording code 105 or another codebase in accordance with the present technology. Data may be derived from static analysis (e.g., code repository scan) and dynamic analysis of code including case testing and unsupervised learning and fuzzing, in additional to similar sources of data for understanding functionality of a codebase and combinations thereof. Based on the static and dynamic analyses of code 105, behavior model 110 is generated.

Behavior model 110 may include the labeling of functional areas of code such as Structured Query Language (SQL) execution, Hypertext Transfer Protocol (HTTP) web services, and security-related functions (e.g., networking, unfiltered user input, SQL generation, authentication and authorization, cryptography, and the like) in addition to other functional areas of code that may exist in a codebase. Behavior model 110 may depict various code paths or scenarios performed in the recorded execution of the code, wherein each code path or scenario may be individually modeled and interpreted in some examples. The individual code paths or scenarios of behavior model 110 may be rolled up to create an architecture depiction of the codebase. The architecture depiction may serve as a holistic platform architecture model that can be utilized by a developed or similar user to understand or interact with aspects of the codebase. In some implementations, aspects of the code may be depicted in a natural-language manner for ease of use and accessibility to a user.

Behavior model 110 or information extracted from behavior model 110 may then be used as the basis for intelligent code suggestions. In process 100, behavior model 110 is used as input to a machine learning engine represented by neural network 115. The machine learning engine then analyzes and interprets (i.e., understands) code behavior across repositories and languages. The machine learning engine may use the information provided to identify, learn, categorize, anticipate, and recommend designs for an application that mimics or behaves similarly to code 105. From the machine learning engine, a code sketch, (i.e., modernized code 120) is generated for any code language and target platform. In some examples, the machine learning engine generates a plurality of prototype codes for any language and target platform. Examples of code languages include but are not limited to JAVASCRIPT, GO, PYTHON, .NET, JAVA, C, C++, SWIFT, RUBY, OBJECTIVE—C, HTML, FORTRAN, APL, PERL, SQL, and Generated prototype code. In some embodiments, the output includes deployment packaging to ease developer ramp-up on new deployment platforms. By including deployment packaging, the uniformity of deployment code can be ensured. Thus, modernized code 120 is deployed to target environment 125. Target environment 125 may be any computing platform suitable for running modernized code 120 including but not limited to a personal computing environment, a time-sharing computing environment, a client server computing environment, a distributed computing environment, a cloud computing environment, or a cluster computing environment. In some examples, target environment 125 comprises a computing service such as AMAZON WEB SERVICES (AWS) LAMBDA, MICROSOFT AZURE, GOOGLE CONTAINER ENGINE, RED HAT OPENSHIFT, KUBERNETES, IBM CLOUD FOUNDRY, ORACLE Cloud Platform, or a similar computing environment.

In some embodiments, once modernized code 120 is deployed in target environment 125, behavior modeling techniques described herein may be used to compare the behavior of modernized code 120 to the behavior of code 105, expected behavior, desired behavior, or variations or combinations thereof. Behavior modeling techniques described herein can be utilized to understand design changes between versions of code and allow a user to visualize old and new code to evaluate correctness, robustness, and security.

Figure 2:
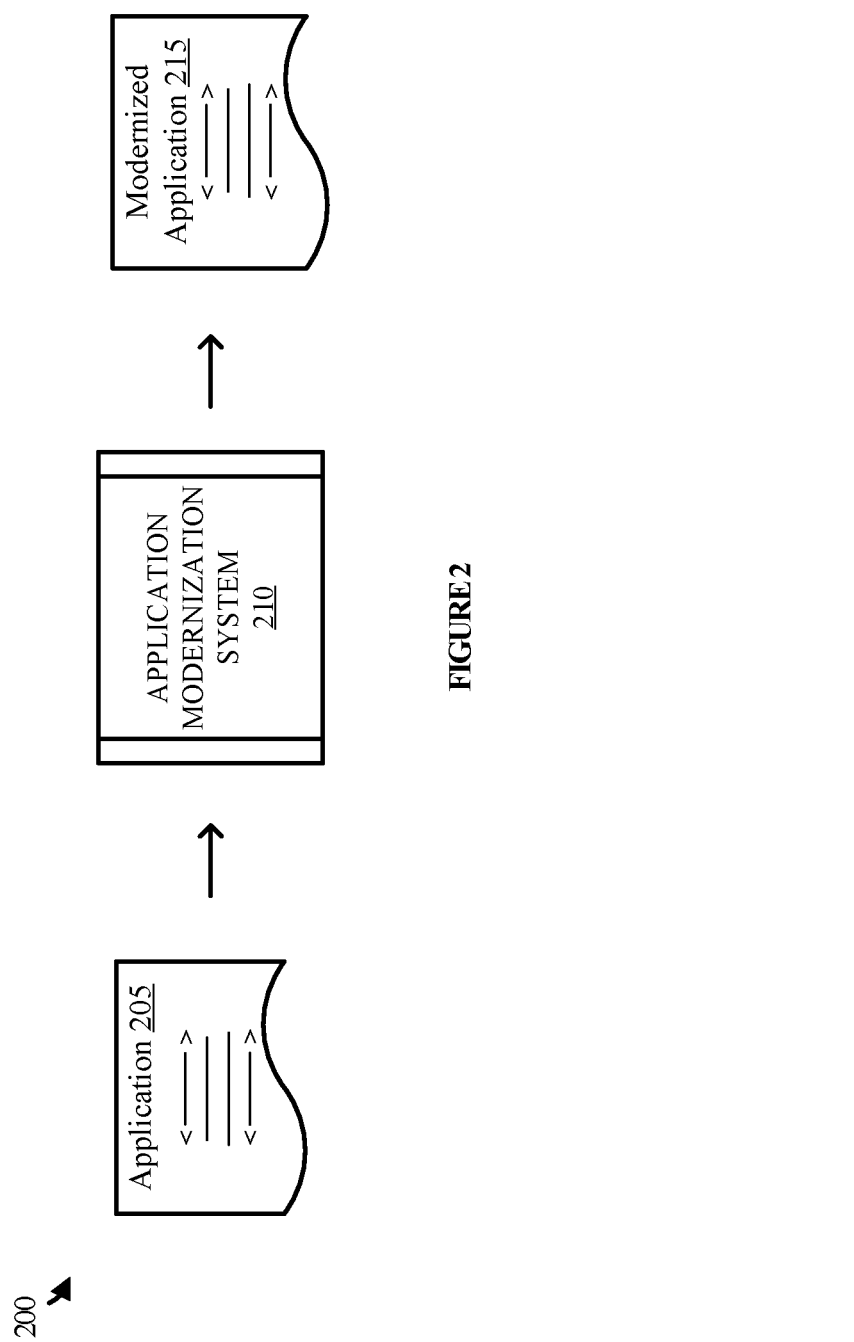
FIG. 2 illustrates a code modernization process that may be utilized in accordance with some embodiments of the present technology.

FIG. 2 illustrates an example of an application modernization process in accordance with certain embodiments of the present technology. Process 200 begins with application 205. Application 205 may be any application for which a user wishes to generate a modernized version. In some scenarios, application 205 was previously developed, and a user wishes to create a similar application in a new language or for a new environment. In the present example, the behavior modeling technology described herein is used for automatic prototyping of programs. Application 205 is provided to application modernization system 210 and application modernization system 210 generates modernized application 215. Application modernization system 210 may generate a behavior model and/or an architecture model based on a recording of a run of application 205 and use the behavior model and/or architecture model to generate modernized application 215 based on a target language and a target platform. In some embodiments, application modernization may enable display of a graphical version of the behavior model and/or the architecture model, while in other embodiments, application modernization system may automatically generate modernized application 215 without enabling display of graphical versions of the one or more models.

Figure 3A:
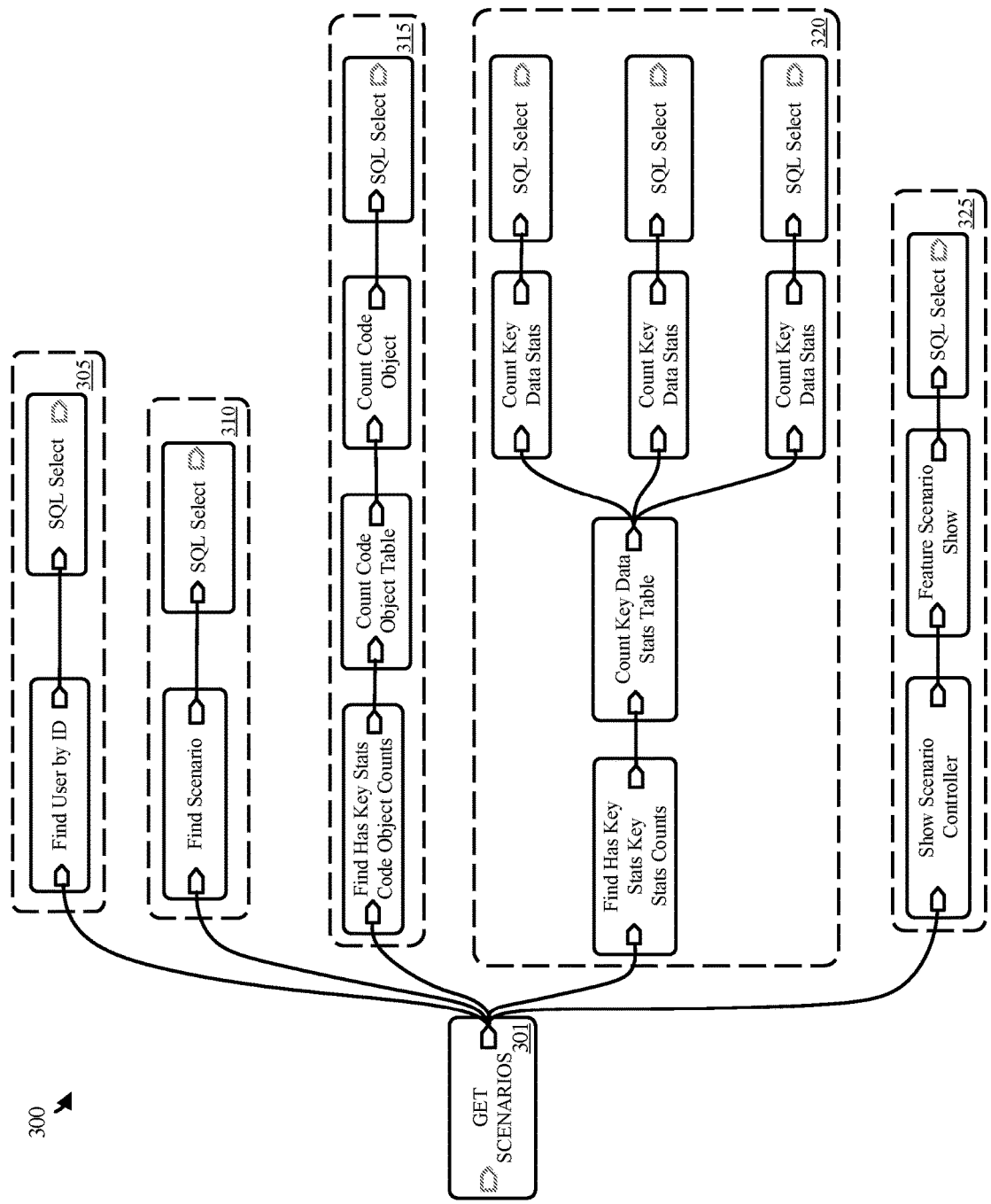
FIG. 3A and FIG. 3B illustrate an example of an application behavior model that may be generated in accordance with some embodiments of the present technology.
Figure 3B:
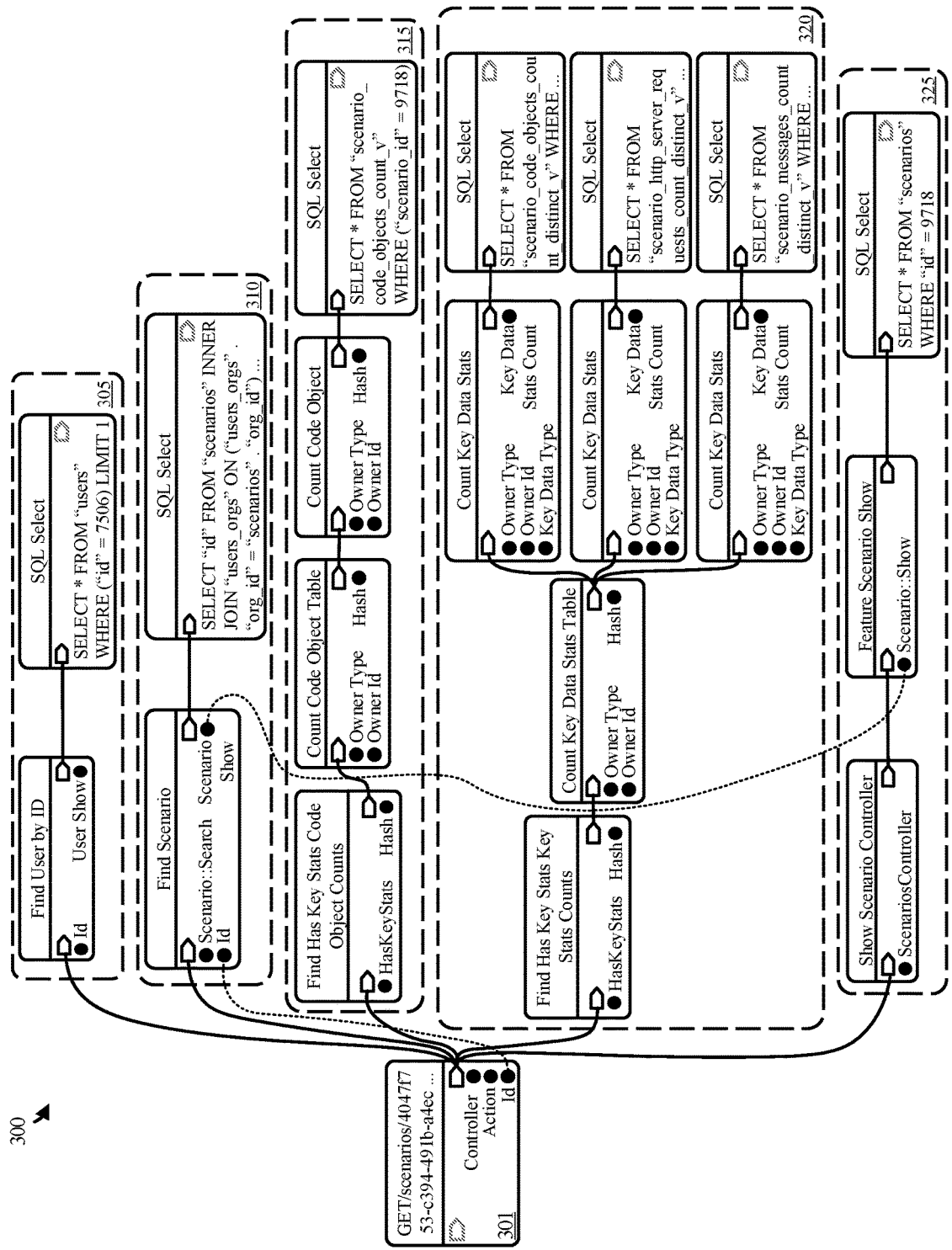

FIG. 3A and FIG. 3B illustrate graphical depictions of a behavior model that may be displayed for a user in accordance with aspects of the present technology. Behavior model 300 is generated based on low-level recordings of a program. Behavior model 300 begins with get scenarios block 301 from which scenario 305, scenario 310, scenario 315, scenario 320, and scenario 325 originate. Each of the scenarios shown includes a code path with one or more propagating steps. For example, scenario 305 begins with step "Find User by ID" and ends with a "SQL Select" step. Scenario 310 begins with step "Find Scenario" and ends with a "SQL Select" step. Scenario 315 begins with step "Find Has Key Stats Code Object Counts," the output of which feeds to "Count Code Object Table," the output of which feeds to "Count Code Object," and ends in a "SQL Select" step.

Scenario 320 begins with step "Find Has Key Stats Key Stats Counts," the output of which feeds to "Count Key Data Stats Table." "Count Key Data Stats Table" provides output to three separate "Count Key Data Stats" blocks each of which provide output to a "SQL Select" step. The final code path shown in behavior model 300, scenario 325, begins with block "Show Scenario Controller," which provides its output to "Feature Scenario Show," which provides an output to a "SQL Select" step.

In addition to the connections and code paths discussed in behavior model 300, it is shown in FIG. 3B that several additional connections exist wherein information may be provided to code blocks. A connection exists between the ID output of get scenarios block 301 and the ID input of the find scenario block in scenario 310. Similarly, a connection exists between the scenario show output of the find scenario block of scenario 310 and the scenario show input of the feature scenario show block of scenario 325. The connections shown serve to exemplify the types of relationships that can be modeled in behavior model 300. Additional relationships, scenarios, block types, connections, code paths, and the like may exist and are anticipated herein.

Behavior model 300 may be presented in a user interface to help a user to understand code behavior, in some examples. Scenarios from the low-level recordings in behavior model 300 may be rolled up into a high-level view of the code architecture in some embodiments. The high-level architecture view may also be presented in a user interface to help a user understand code behavior and structure. Information from behavior model 300 may be used to generate new code that behaves similarly to or mimics the behavior of an existing program, regardless of whether any models are displayed in a user interface.

Figure 4A:
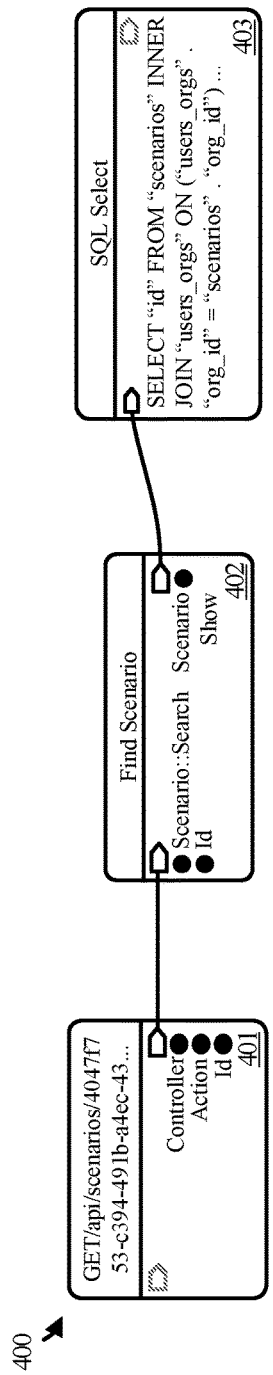
FIGS. 4A-4C illustrate a series of different versions of behavior models that may be utilized to depict design changes between versions in accordance with some embodiments of the present technology.
Figure 4B:
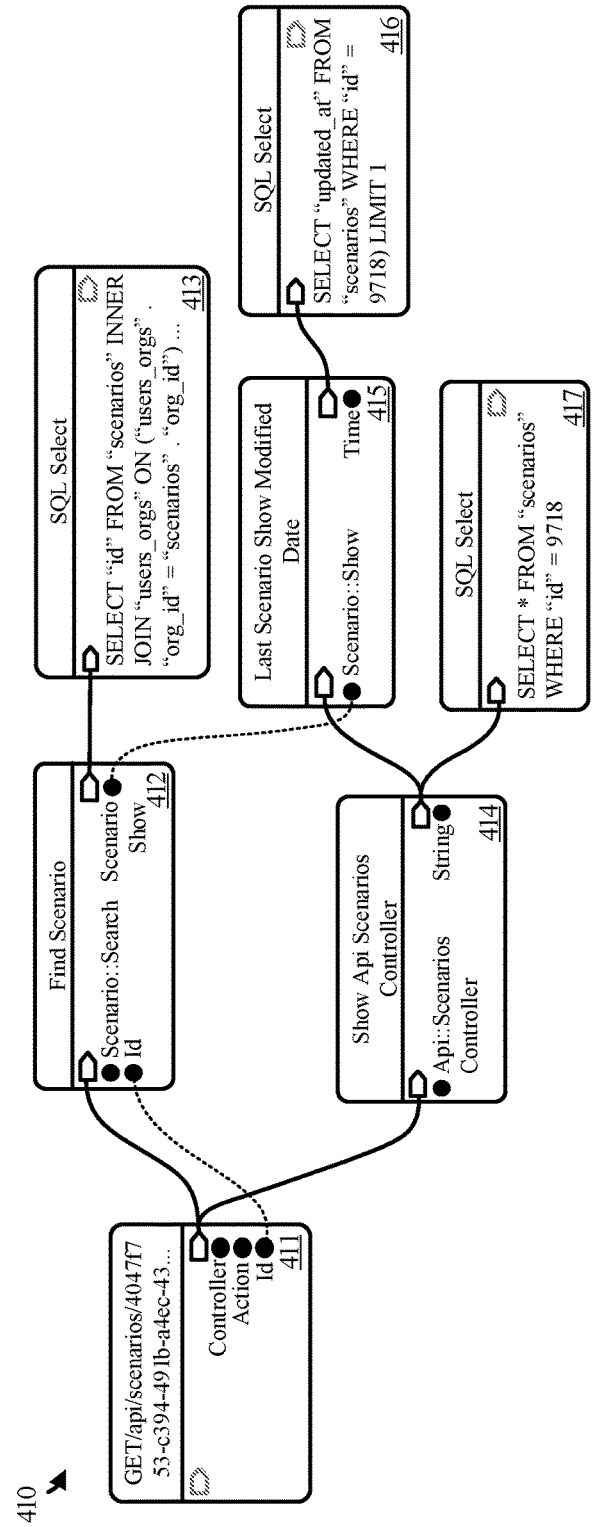
Figure 4C:
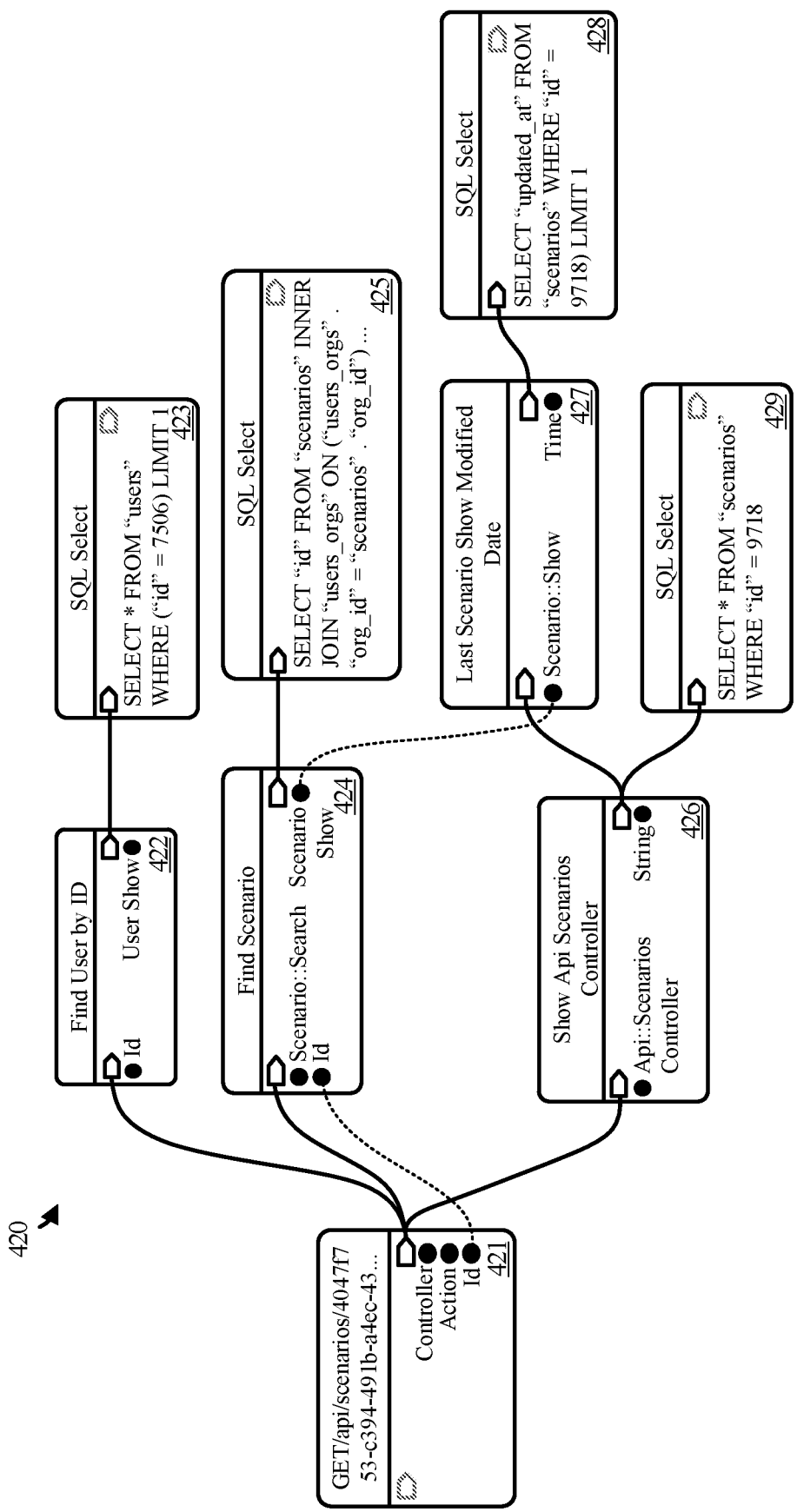

FIG. 4A, FIG. 4B, and FIG. 4C illustrate behavior models of different versions of a program in accordance with some embodiments of the present technology. In some examples, each of behavior model 400, behavior model 410, and behavior model 420 may be displayed in a user interface such that a user may visually compare them to one another. In FIG. 4A, behavior model 400 represents a first version of the program. The first block of behavior model, block 401, includes a "Get Scenarios" block, which provides output to block 402, a "Find Scenario" block, which provides output to block 403, a "SQL Select" block.

FIG. 4B includes behavior model 410, which represents a subsequent version of the program. Behavior model 410 includes additional blocks, additional code paths, and additional relationships to the first version shown in FIG. 4A. In FIG. 4B, behavior model 410 begins at a get scenarios block, block 411. Block 411 provides output to two code paths. In the upper code path, block 412 receives input from block 411 including ID information. Block 412 provides output to block 413, a SQL select block. Block 412 also provides scenario show information to block 415. Block 414, show API scenarios controller block, receives input from block 411 and outputs to two blocks: block 415, last scenario show modified date, and block 417, SQL select. Block 415 outputs to block 416, SQL select.

FIG. 4C includes behavior model 420 which represents a final version of the program. Behavior model 420 begins at block 421, a get scenarios block, which outputs to three distinct code paths. The upper code path starts with block 422, find user by ID, which outputs to block 423, SQL select. The middle code path starts with block 424, find scenario, which outputs to block 425, SQL select. Block 424 also outputs scenario show information to block 427. The lower code path starts at block 426, show API scenarios controller, which provides output to block 427, last scenario show modified date, and block 429, SQL select. Block 427 outputs to block 428, SQL select.

FIG. 4A, FIG. 4B, and FIG. 4C serve to illustrate the advantages provided by the ability to visualize old and new code, or different versions of code, nearby one another or side-by-side. Behavior model 400, behavior model 410, and behavior model 420 may be displayed in a user interface to help a developer or another user understand design changes from one version to the next. Visualizing different versions of a program in this manner enables simple evaluation of correctness, robustness, and security, in addition to other program considerations and factors.

Figure 5A:
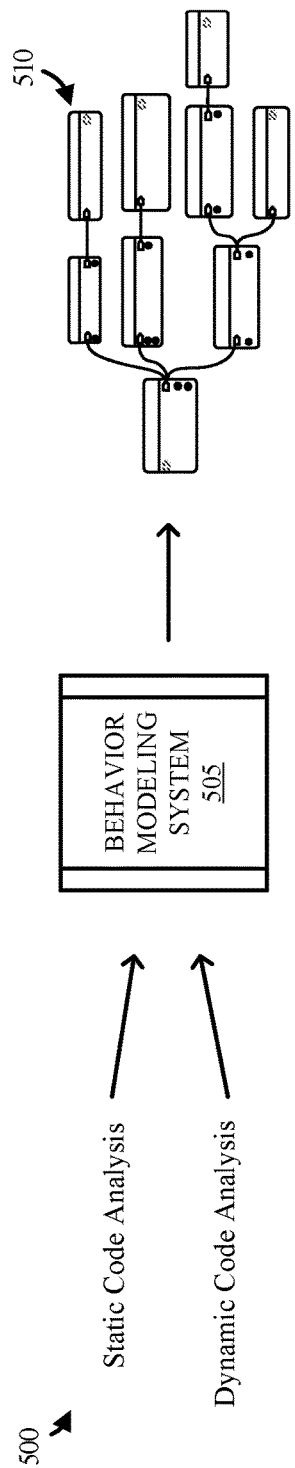
FIG. 5A illustrates a behavior modeling process in accordance with some embodiments of the present technology.

FIG. 5A illustrates process 500 for generating a behavior model in accordance with certain aspects of the present technology. In process 500, static code analysis and dynamic code analysis are used as inputs to behavior modeling system 505. Behavior modeling system 505 then produces behavior model 510 based on these inputs. Behavior modeling system 505, in accordance with some embodiments of the present technology, extracts information from a recording of a program to generate behavior model 510. In order to do this, behavior modeling system 505 filters through the data in the recording to identify steps, scenarios, components, subcomponents, and features of the program. In some implementations, the present technology is used for behavior modeling without code generation. Behavior modeling may serve to assist developers understand a program on multiple levels and does not require the generation of new code.

Figure 5B:
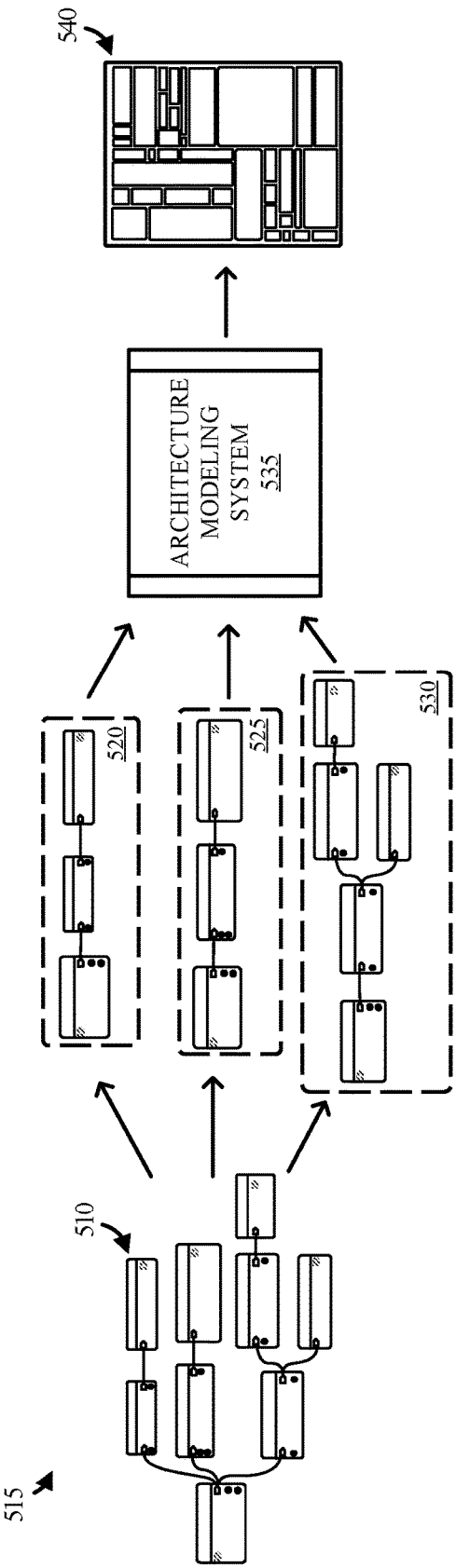
FIG. 5B illustrates an architecture modeling process in accordance with some embodiments of the present technology.
Figure 6:
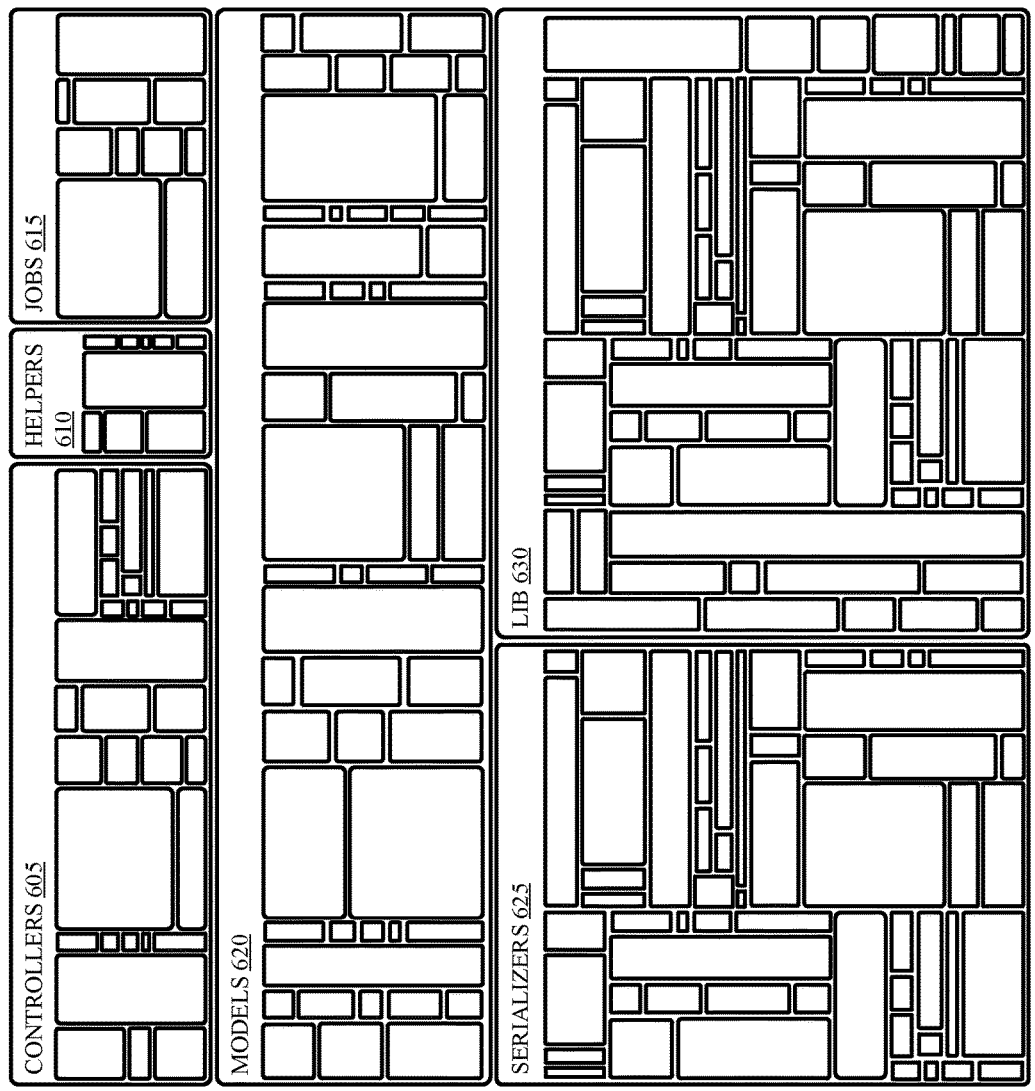
FIG. 6 illustrates an example of an architecture depiction in accordance with some embodiments of the present technology.

FIG. 5B illustrates process 515 for generating an architecture model from behavior model 510. Behavior model 510 is first divided into its identified code paths. In the present example, behavior model 510 includes code path 520, code path 525, and code path 530, which may each be used to make up their own behavior model representing a subset of behavior model 510. These behavior models of individual scenarios may then be used by architecture modeling system 535 to generate architecture model 540 in which features of the application are labeled and categorized. A holistic platform architecture model may be embodied in many different manners from those described herein and the architecture model depiction shown here and in FIG. 6 is provided solely for purposes of explanation. Architecture modeling system 535 rolls up the application code paths into architecture model 540, in which different features of the application may be modeled and shown in a high-level view that can be drilled into by a user for lower-level data.

FIG. 6 illustrates an example of an architecture depiction in accordance with certain aspects of the present technology. Architecture model 600 shows a high-level depiction of a program and includes six classes of components: controllers 605, helpers 610, jobs 615, models 620, serializers 625, and lib 630. A developer or user interacting with architecture model 600 may select a class or function to find more information (i.e., lower level information) on the class or function. The blocks shown (i.e., features) within each component class of architecture model 600 may be selected in a user interface to enable a developer or other user to drill down into more detail regarding that aspect of the program. Architecture model 600 may be used to illustrate packages, classes, functions, SQL queries, server requests, messages, and the like in addition to different feature groups such as activity, authentication, notifications, post authoring, and the like.

Information may be presented in a natural language manner such that features of the application can be understood from a behavior or architecture standpoint. For example, activity features may include descriptions such as "page view requests are recorded," "record the number of times which a topic is viewed," "topic user activity is recorded," "user timing activity on a post and last read information is recorded," "user timing activity on a topic is recorded," and similar. Examples of authentication features may include, "login via user interface," "login with credentials," "login with valid credentials," "logout an active user session," "user logs in successfully," and similar. An example of a notification feature may include "user can ignore another user for a specific amount of time" or similar. An example of a post authoring feature may include "a user who created a topic can delete posts from it" or similar. As previously mentioned, architecture model 600 is not intended to limit the scope of the architecture modeling technology and is provided solely for purposes of explanation.

Figure 7:
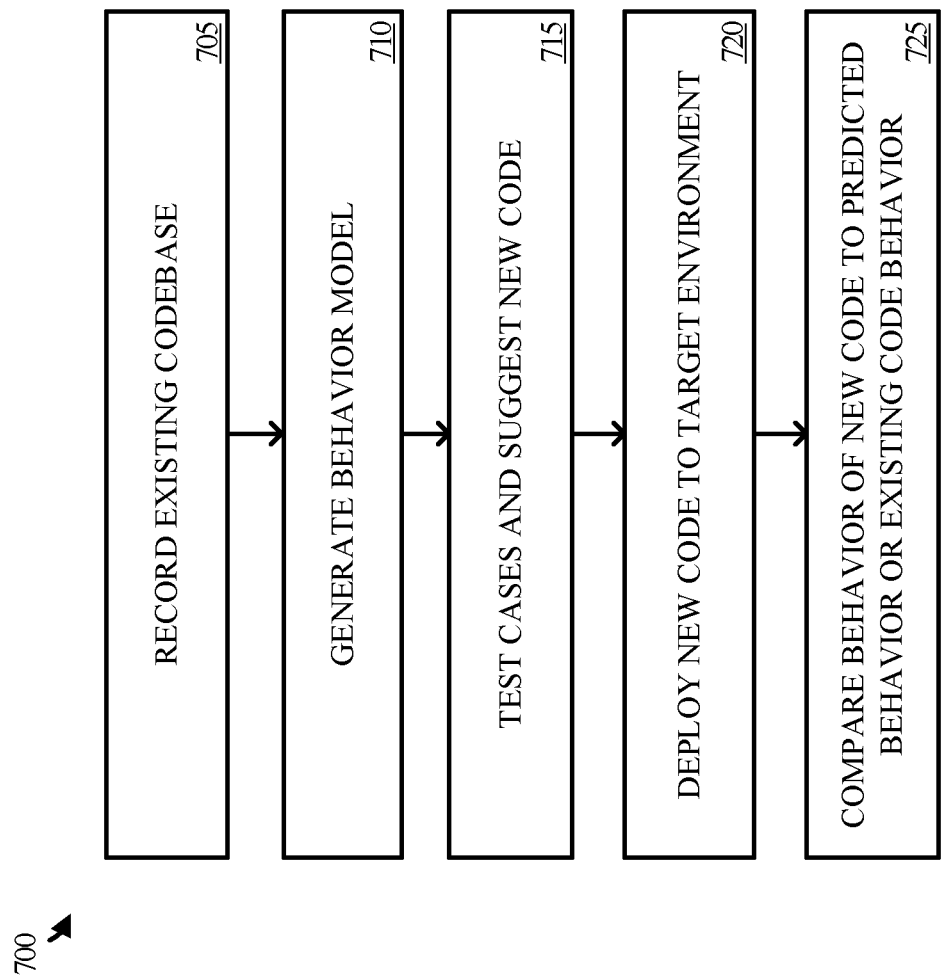
FIG. 7 illustrates an example of a code modernization process in accordance with some embodiments of the present technology.

FIG. 7 is a flow chart illustrating process 700 for modernizing code in accordance with embodiments of the present technology. In step 705, an application modernization system records an existing codebase. Recording an existing codebase is different from reading existing code. To record an existing codebase, the system records a run of the code and uses dynamic and static data analysis to identify what the application is doing from a functionality and behavior standpoint. Based on the recorded information, the application modernization system generates a behavior model in step 710. The behavior model may take a form similar to that shown in the preceding Figures or may differ in appearance or functionality. In some examples, the behavior model is displayed in a user interface such that a developer may use the model to understand the code behavior. In other examples, a graphical version of the behavior model is not created for display in a user interface and is solely for purposes of use by the application modernization system when generating new code. Generating the behavior model may include identifying and labeling one or more functional areas of code, identifying one or more code paths connecting steps performed by the existing code, and identifying important decision points and code branches between functional areas of the existing code.

In step 715, the behavior model is used to suggest new code and test cases. The new code, in some examples, mimics the behavior of the existing program. In some examples, suggesting new codes and testing cases utilizes a machine learning engine in which the behavior model is used as input to one or more machine learning algorithms that may include but is not limited artificial neural networks. Cases may then be tested with the new code to ensure robustness, accuracy, security, and the like. In step 720, the application modernization system deploys the new code to a target environment. In some examples, a target language and target environment are identified before generating the new code and deploying the new code is performed based on the identified information. Once the new code is deployed to the target environment, the behavior of the new code can be compared to predicted behavior or existing code behavior in step 725.

In some embodiments of the present technology, an application modernization system runs in any staging environment used by a developer or user. For example, the application modernization system may be a plug-in or similar agent to a staging environment such that it is integrated into the environment for recording application runs. The system may be a browser plug-in in some implementations. In an embodiment of the present technology, a user indicates to the application modernization system, via the plug-in or agent, to start recording. The user may then run the application and stop the recording when its finished running. The data may then be sent to another window, a client browser extension, a pop-up, another application, or similar that can then show and be used to interact with the data and flow diagram showing what the application does.

Figure 8:
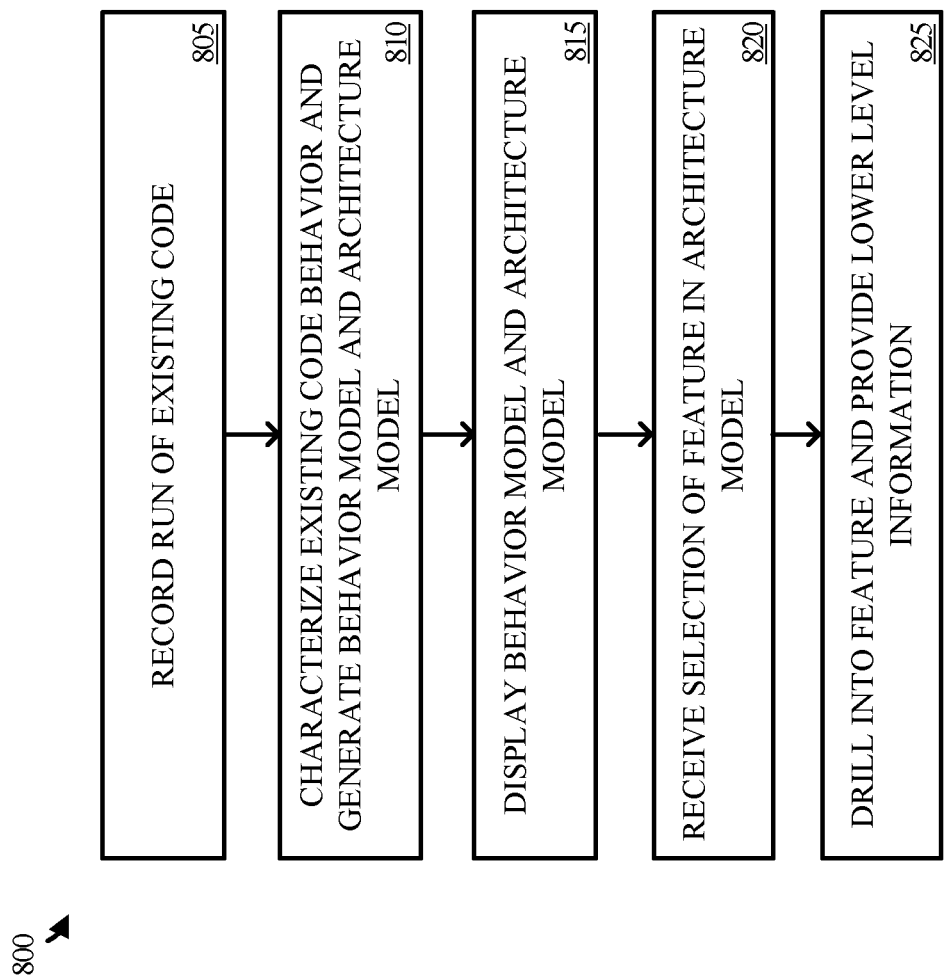
FIG. 8 illustrates an example of a code modernization process in accordance with some embodiments of the present technology.

FIG. 8 is a flow chart illustrating process 800 for application behavior modeling in accordance with aspects of the present technology. In step 805, an application modernization system records a run of existing code. In some examples, the run is recorded by a plug-in or similar agent in a staging environment. In step 810, the application modernization system characterizes existing code behavior and generates a behavior model and an architecture model. Characterizing existing code behavior and generating the behavior model may include identifying and labeling one or more functional areas of code, identifying one or more code paths connecting steps performed by the existing code, and identifying important decision points and code branches between functional areas of the existing code, in some embodiments.

In step 815, the behavior model and architecture model are displayed. In some implementations, the application modernization system enables display of the behavior model and the architecture model in a user interface of a computing device. In step 820, the application modernization system receives a selection of a feature in the architecture model. In some examples, this comprises a developer or user selecting a block from an architecture model such as in architecture model 600. In step 825, the application modernization system drills into the selected feature and provides lower level information related to the feature. In some embodiments, features may be determined automatically by an application modernization system as described herein. The system may use information about web services, commands, background jobs, or similar entry points into an application to automatically identify features that may then be presented to a user and drilled into for access to the lower level information.

Figure 9:
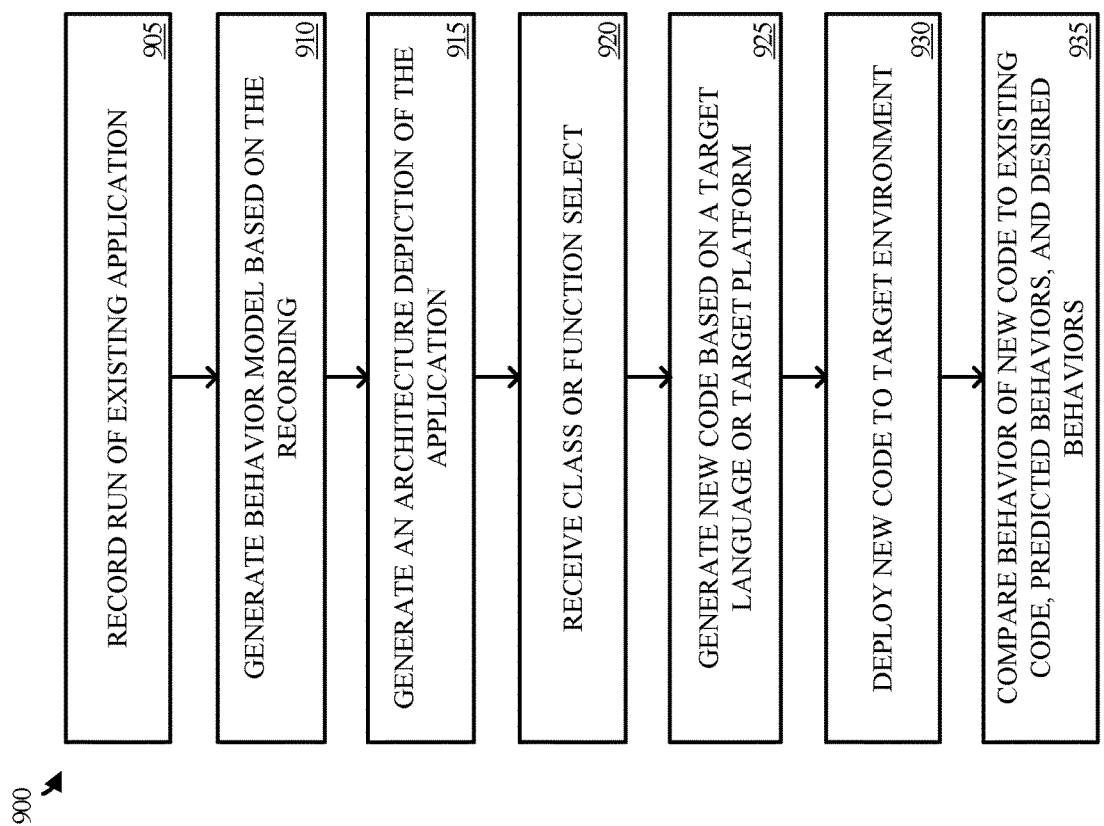
FIG. 9 illustrates an example of a code modernization process in accordance with some embodiments of the present technology.

FIG. 9 is a flow chart illustrating process 900 for modernizing code in accordance with some embodiments of the present technology. In step 905, an application modernization program records a run of an existing application. Based on the run of the existing application, the application modernization system generates a behavior model in step 910. In some examples, the behavior model is similar to the behavior models described in reference to the preceding Figures. The behavior model may be displayed in a user interface for use by a developer or other user, or the behavior model may not be displayed at all and solely used by the system for purposes of generating new code based on the behavior model. In step 915, the application modernization system generates an architecture depiction of the application. In some examples, generating the architecture depiction includes rolling up individual code paths from the behavior model to generate a high-level depiction of the codebase architecture. In some examples, the architecture depiction is displayed in a user interface for use by a developer or other user.

In step 920, the application modernization system receives a class or function select as input prior to generating a new version of the application. A target language and target environment are also indicated to the application modernization system. In step 925, the application modernization system generates new code based on the target language or target platform. The new code is not a translation of the existing application. The new code is generated based on the generated models such that the new code is written in a way more conducive to the new language, platform, or environment. In some embodiments, generating the new code uses machine learning techniques. Machine learning techniques may be used to optimize new codes based on their target languages and environments. In some examples, the machine learning techniques comprise one or more trained neural networks that take information from the behavior model and/or architecture model as input and generate a program that mimics the behavior of the existing application or behaves similarly to the existing application.

In step 930, the application modernization system deploys the new code to the target environment. Once the new code is deployed, the application modernization system may compare the behavior of the new code to the behavior of the existing application, or may approve or reject the new code. In some examples, the behavior of the new code is also compared to predicted behaviors, desired behaviors, or the like. Code versions may be compared in one or more windows of the application modernization system as discussed in reference to the preceding Figures.

Figure 10:
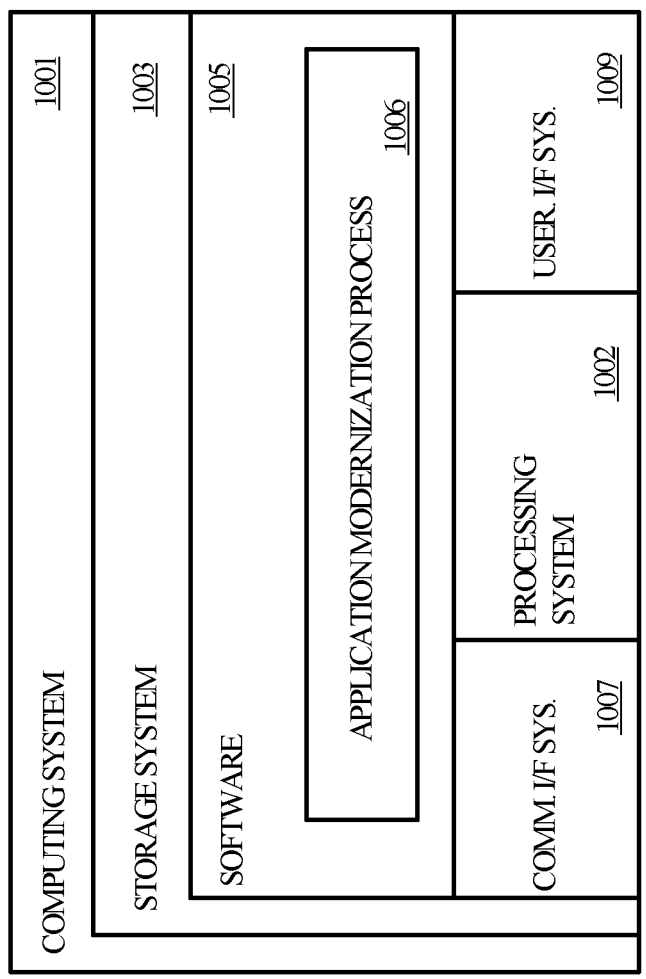
FIG. 10 illustrates an example of a computing system that may be used to perform operations described herein in accordance with some embodiments of the present technology.

FIG. 10 illustrates computing system 1001 to perform application modernization according to an implementation of the present technology. Computing system 1001 is representative of any system or collection of systems with which the various operational architectures, processes, scenarios, and sequences disclosed herein for application modeling and modernization may be employed. Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009.

Processing system 1002 loads and executes software 1005 from storage system 1003. Software 1005 includes and implements application modernization process 1006, which is representative of the application modernization discussed with respect to the preceding Figures. When executed by processing system 1002 to provide application modernization functions, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including application modernization process 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing a code modeling and prototyping system as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded into processing system 1002 and executed, transform a suitable apparatus, system, or device (of which computing system 1001 is representative) overall from a general-purpose computing system into a special-purpose computing system customized to provide application modernization functions as described herein. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of an application modernization system, it should be understood that the systems and methods described herein are not limited to such embodiments and may apply to a variety of other software development processes and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method of updating software code, the method comprising:
    recording a run of existing code written in a first programming language;
    interrogating the recording to generate a behavior model of the run, wherein the behavior model represents a behavior of the existing code, and wherein interrogating the recording comprises:
        identifying and labeling one or more functional areas of the existing code,
        identifying decision points and code branches between functional areas of the existing code, and
        identifying one or more code paths connecting steps performed by the existing code;
    providing the behavior model and a target programming language as input to an artificial intelligence algorithm trained to generate new code based on the input, wherein:
        the new code, when executed, mimics the behavior of the existing code,
        the new code is written in the target programming language, and
        the target programming language is a different programming language than the first programming language;
    receiving, as output from the artificial intelligence algorithm, the new code; and
    deploying the new code to a target environment.

2. The computer-implemented method of claim 1, further comprising:
    generating a graphical depiction of the behavior model.

3. The computer-implemented method of claim 1, further comprising:
    generating an architecture depiction of the existing code, wherein the architecture depiction depicts one or more features of the existing code.

4. The computer-implemented method of claim 3, wherein generating the architecture depiction further comprises generating a high-level view of the existing code by rolling up the one or more code paths.

5. The computer-implemented method of claim 1, further comprising:
    characterizing the existing code based on the behavior model, wherein characterizing the existing code based on the behavior model comprises:
        characterizing one or more features of the existing code; and
        characterizing one or more of dependencies, logic, and data queries.

6. The computer-implemented method of claim 1, further comprising:
    recording a run of the new code;
    interrogating the recording of the run of the new code to generate a second behavior model of the run of the new code; and
    generating a graphical depiction of the behavior model and the second behavior model.

7. The computer-implemented method of claim 1, further comprising:
    comparing behavior of the new code to one or more of the behavior of the existing code, predicted behavior of the new code, and desired behavior of the new code.

8. The computer-implemented method of claim 1, further comprising:
    recording a run of a second version of the existing code;
    interrogating the recording of the run of the second version to generate a second behavior model; and
    generating a graphical depiction of the behavior model and the second behavior model.

9. A system comprising:
    one or more processors; and
    a memory having program instructions stored thereon that, upon execution by the one or more processors, cause the one or more processors to:
        record a run of existing code written in a first programming language,
        interrogate the recording to generate a behavior model of the run, wherein the behavior model represents a behavior of the existing code, and wherein interrogating the recording comprises:
            identifying and labeling one or more functional areas of the existing code;
            identifying decision points and code branches between functional areas of the existing code; and
            identifying one or more code paths connecting steps performed by the existing code,
        provide the behavior model and a target programming language as input to an artificial intelligence algorithm trained to generate new code based on the input, wherein:
            the new code, when executed, mimics the behavior of the existing code;
            the new code is written in the target programming language; and
            the target programming language is a different programming language than the first programming language,
        receive, as output from the artificial intelligence algorithm, the new code, and
        deploy the new code to a target environment.

10. The system of claim 9, wherein the memory comprises further program instructions that, upon execution by the one or more processors, cause the one or more processors to:
    generate a graphical depiction of the behavior model.

11. The system of claim 9, wherein the memory comprises further program instructions that, upon execution by the one or more processors, cause the one or more processors to:
    generate an architecture depiction of the existing code, wherein the architecture depiction depicts one or more features of the existing code.

12. The system of claim 11, wherein the program instructions to generate the architecture depiction comprise further program instructions that, upon execution by the one or more processors, cause the one or more processors to:
    generate a high-level view of the existing code by rolling up the one or more code paths.

13. The system of claim 9, wherein the memory comprises further program instructions that, upon execution by the one or more processors, cause the one or more processors to:
    characterize one or more features of the existing code; and
    characterize one or more of dependencies, logic, and data queries.

14. The system of claim 9, wherein the memory comprises further program instructions that, upon execution by the one or more processors, cause the one or more processors to:
    record a run of the new code;
    interrogate the recording of the run of the new code to generate a second behavior model of the run of the new code; and
    generate a graphical depiction of the behavior model and the second behavior model.

15. The system of claim 9, wherein the memory comprises further program instructions that, upon execution by the one or more processors, cause the one or more processors to:
compare behavior of the new code to one or more of the behavior of the existing code, predicted behavior of the new code, and desired behavior of the new code.

16. The system of claim 9, wherein the program instructions to generate the behavior model comprise further program instructions that, upon execution by the one or more processors, cause the one or more processors to:
record a run of a second version of the existing code;
interrogate the recording of the run of the second version to generate a second behavior model; and
generate a graphical depiction of the behavior model and the second behavior model.

17. A computer-readable storage device having stored thereon instructions that, upon execution by one or more processors, cause the one or more processors to:
record a run of existing code written in a first programming language;
interrogate the recording to generate a behavior model of the run, wherein the behavior model represents a behavior of the existing code, and wherein interrogating the recording comprises:
identifying one or more functional areas of the existing code,
identifying decision points and code branches between functional areas of the existing code, and
identifying one or more code paths connecting steps performed by the existing code;
provide the behavior model and a target programming language as input to an artificial intelligence algorithm trained to generate new code based on the input, wherein:
the new code, when executed, mimics the behavior of the existing code,
the new code is written in the target programming language, and
the target programming language is a different programming language than the first programming language; and
deploy the new code to a target environment.

18. The computer-readable storage device of claim 17, having stored thereon further instructions that, upon execution by the one or more processors, cause the one or more processors to:
generate a graphical depiction of the behavior model.

19. The computer-readable storage device of claim 17, having stored thereon further instructions that, upon execution by the one or more processors, cause the one or more processors to:
generate an architecture depiction of the existing code, wherein the architecture depiction depicts one or more features of the existing code.

20. The computer-readable storage device of claim 19, wherein the instructions to generate the architecture depiction comprise further instructions that, upon execution by the one or more processors, cause the one or more processors to:
generate a high-level view of the existing code by rolling up the one or more code paths.

\* \* \* \* \*